US011196694B2

(12) United States Patent
Werner et al.

(10) Patent No.: US 11,196,694 B2
(45) Date of Patent: Dec. 7, 2021

(54) DISCOVERABLE ELECTRONIC MESSAGES

(71) Applicant: KOYA Innovations, Inc., Austin, TX (US)

(72) Inventors: Jon H. Werner, Austin, TX (US); Cherie Werner, Austin, TX (US); Caryn Noel Werner, Austin, TX (US); Courtney Werner, Austin, TX (US)

(73) Assignee: KOYA INNOVATIONS, INC., Austin, TX (US)

( * ) Notice: Subject to any disclaimer, the term of this patent is extended or adjusted under 35 U.S.C. 154(b) by 97 days.

(21) Appl. No.: 16/552,736

(22) Filed: Aug. 27, 2019

(65) Prior Publication Data
US 2020/0067868 A1 Feb. 27, 2020

Related U.S. Application Data

(60) Provisional application No. 62/723,268, filed on Aug. 27, 2018.

(51) Int. Cl.
*H04L 12/58* (2006.01)
*H04L 29/08* (2006.01)

(52) U.S. Cl.
CPC ............ *H04L 51/22* (2013.01); *H04L 51/043* (2013.01); *H04L 51/12* (2013.01); *H04L 51/14* (2013.01); *H04L 67/22* (2013.01)

(58) Field of Classification Search
CPC ....... H04L 67/306; H04L 67/18; H04L 51/14; H04L 63/102; H04L 51/043; H04L 67/22; H04L 51/22; H04L 51/12; G06Q 10/107
See application file for complete search history.

(56) References Cited

U.S. PATENT DOCUMENTS 9,378,515 B1  6/2016 Hassett
2007/0161382 A1*  7/2007 Melinger ............... H04L 67/18
455/456.1
(Continued)

OTHER PUBLICATIONS

Geron, Tomio, "GiftRocket Seeks to Reinvent Gift Cards", Forbes Media LLC, Apr. 14, 2011.
(Continued)

*Primary Examiner* — Jungwon Chang
(74) *Attorney, Agent, or Firm* — Brian F. Russell; Russell Ng PLLC

(57) ABSTRACT

A message sender crafts an electronic message and addresses the electronic message to at least one message recipient. The message sender can further specify one or more discoverability criteria, such as a time criterion, a geolocation criterion, etc. In some embodiments, the message sender can create the electronic message and specify the discoverability criteria utilizing an application program executing on an electronic communication device of the sender or a browser-based application. The sender submits the electronic message to a message service, which can be provided, for example, by a message server coupled to the Internet. Although the electronic message is submitted to the message service, content of the electronic message is not immediately delivered to the message recipient. Instead, the message server reveals the content of the electronic message to the message recipient when at least some, and in some cases all, of the discoverability criteria are satisfied.

16 Claims, 14 Drawing Sheets

(56) References Cited

U.S. PATENT DOCUMENTS

| | | | | |
|---|---|---|---|---|
| 2008/0201433 A1* | 8/2008 | McDonald | ............ | G06Q 10/107 |
| | | | | 709/206 |
| 2010/0121925 A1* | 5/2010 | Champlin-Scharff | ....................... | |
| | | | | H04L 51/14 |
| | | | | 709/206 |
| 2016/0021037 A1* | 1/2016 | Hewitt | .................. | H04L 63/102 |
| | | | | 715/752 |
| 2018/0063044 A1* | 3/2018 | Mikhailov | ............ | H04L 67/306 |
| 2018/0152403 A1* | 5/2018 | Charignon | .............. | H04L 67/22 |

OTHER PUBLICATIONS

Techcrunch, "GiftRocket Lets You Send Gifts That Can Be Redeemed At Specific Locations", Verizon Media, Mar. 21, 2011.

Schonfeld, Erick, "Leave Money In Real Places For Your Foursquare Friends With Gifi", TechCrunch, Sep. 27, 2010.

* cited by examiner

DISCOVERABLE ELECTRONIC MESSAGES

BACKGROUND OF THE INVENTION

The present invention relates to electronic communication, and more specifically, to electronic communication of electronic messages whose discoverability can be made dependent on the satisfaction of various criteria.

With the pervasive use of electronic devices, such as smartphones, laptop computers, tablet computers and smart watches, people now commonly communicate via any of a number of alternative electronic communication modalities, including voice and video calls, emailing, texting, instant messaging, and social media messaging. The availability of a variety of modalities of electronic communication can enhance communication in that a person can select a preferred electronic communication modality (and switch between communication modalities) based on factors such as the parameters of their current environment (e.g., ambient noise level and privacy), the length and content of the communication, etc.

As described herein, electronic communication can be further enhanced through a new electronic communication modality in which the discoverability of messages by a message recipient can be made dependent on the satisfaction of one or more criteria.

BRIEF SUMMARY

In some embodiments, a message sender crafts an electronic message and addresses the electronic message to at least one message recipient. The electronic message can include one or more electronic communication modalities, such as audio, video, text, graphics, etc. The message sender can further specify one or more discoverability criteria, such as day(s) of the week, calendar date(s), time(s) of day, geolocation of a message recipient, geolocation of the message sender, proximity of a message recipient to a geolocation, etc. In some embodiments, the message sender can create the electronic message and specify the discoverability criteria utilizing an application program executing on an electronic communication device of the sender (an "app") or a browser-based application. The message sender then submits the electronic message to a message service, which can be provided, for example, by a message server coupled to the Internet.

Although the electronic message is submitted to the message service, the content of the electronic message is not immediately delivered to the message recipient, for example, as is conventional with electronic mail (email) or text messages. Instead, the message server reveals the content of the electronic message to the message recipient when at least some, and in some cases all, of the discoverability criteria are satisfied. When the requisite message criterion or criteria is/are satisfied, the message recipient is able to receive the content of the electronic message. A notification of the existence of the message can be provided, for example, by an app executing on an electronic communication device of the message recipient. In some embodiments, the notification of the existence of the message can be provided in advance of receipt of the content of the electronic message by the message recipient.

It should be appreciated that although this new modality of electronic communication has clear commercial application, this new modality of electronic communication does not constitute a method of doing business per se.

DETAILED DESCRIPTION

Figure 1:
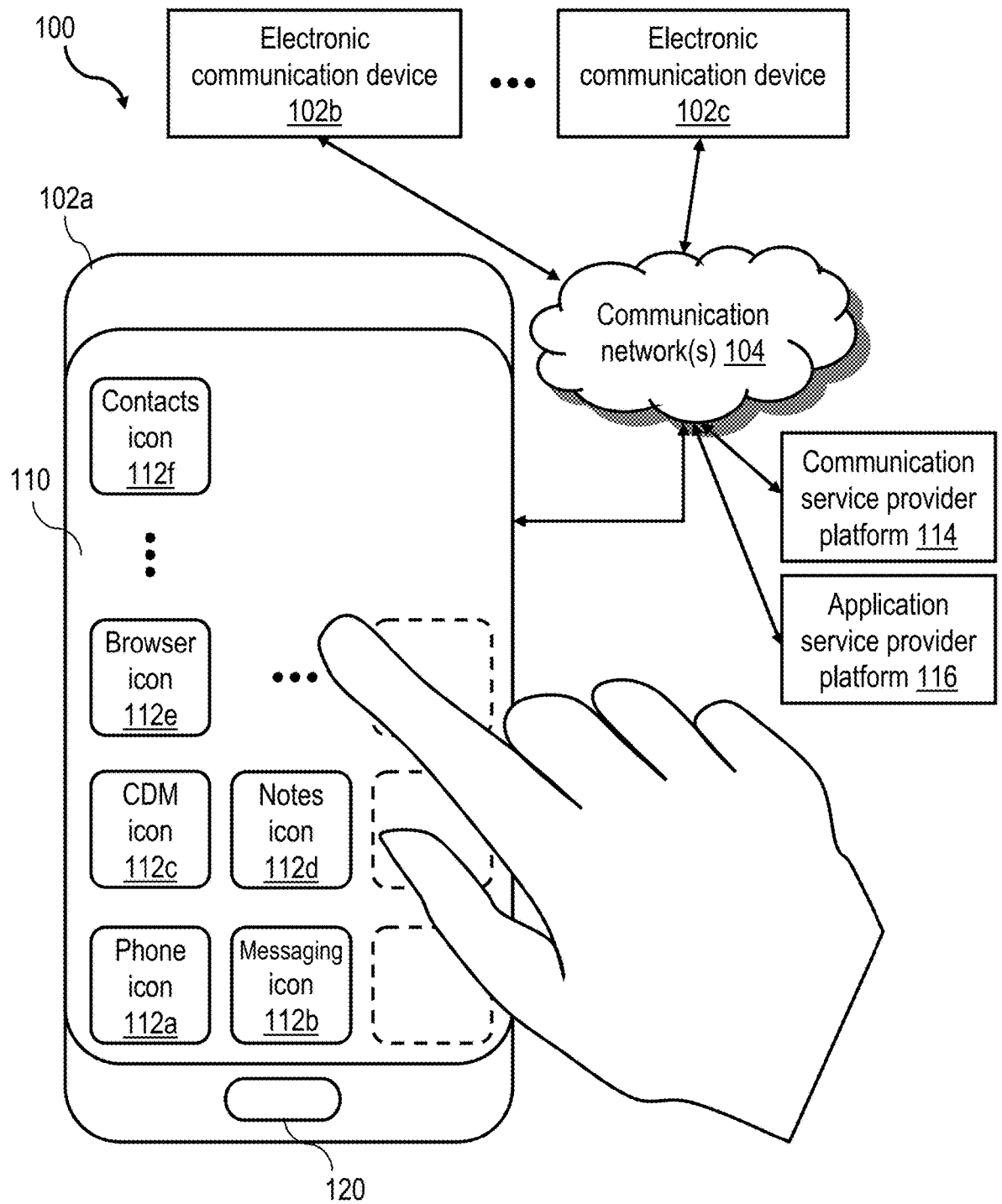
FIG. 1 is a high-level block diagram of an electronic communication environment in accordance with one embodiment.

With reference now to the figures, and in particular with reference to FIG. 1, there is illustrated an electronic communication environment 100 in which the inventions disclosed herein may advantageously be utilized. Electronic communication environment 100 includes an electronic communication device 102a, which as described in greater detail below may be utilized to communicate electronically with one or more additional electronic communication devices, such as electronic communication devices 102b, 102c, via one or more communication networks 104. In various realizations of electronic communication environment 100, communication network(s) 104 may include, for example, a wireless wide-area network (WAN) including a plurality of distributed terrestrial, atmospheric, and/or satellite-based antennae supporting long range two-way radio frequency communication. Communication network(s) 104 may alternatively or additionally include one or more circuit-switched and/or packet-switched communication networks, including, for example, the Internet.

Communication between electronic communication device 102a and other electronic communication devices may be handled directly by the electronic communication devices themselves (i.e., via peer-to-peer communication) and/or may be facilitated by a third-party platform, such as a communication service provider platform 114 and/or application service provider platform 116. Communication service provider platform 114 is a data processing system associated with and/or operated by a network infrastructure or network service company that provides one or more electronic communication services (e.g., Internet, telephony, text messaging, etc.) to one or more of electronic communication devices 102. Application service provider platform 116 is a data processing system associated with and/or operated by a source or provider of one or more of electronic communication applications that can executed to provide electronic communication between electronic communication devices 102 as discussed further below. These network-connected third-party platforms 114, 116 may serve as intermediaries that relay electronic communication between electronic communication devices 102, and may provide temporary and/or long term storage of the content of electronic messages communicated between electronic communication devices 102.

Figure 2:
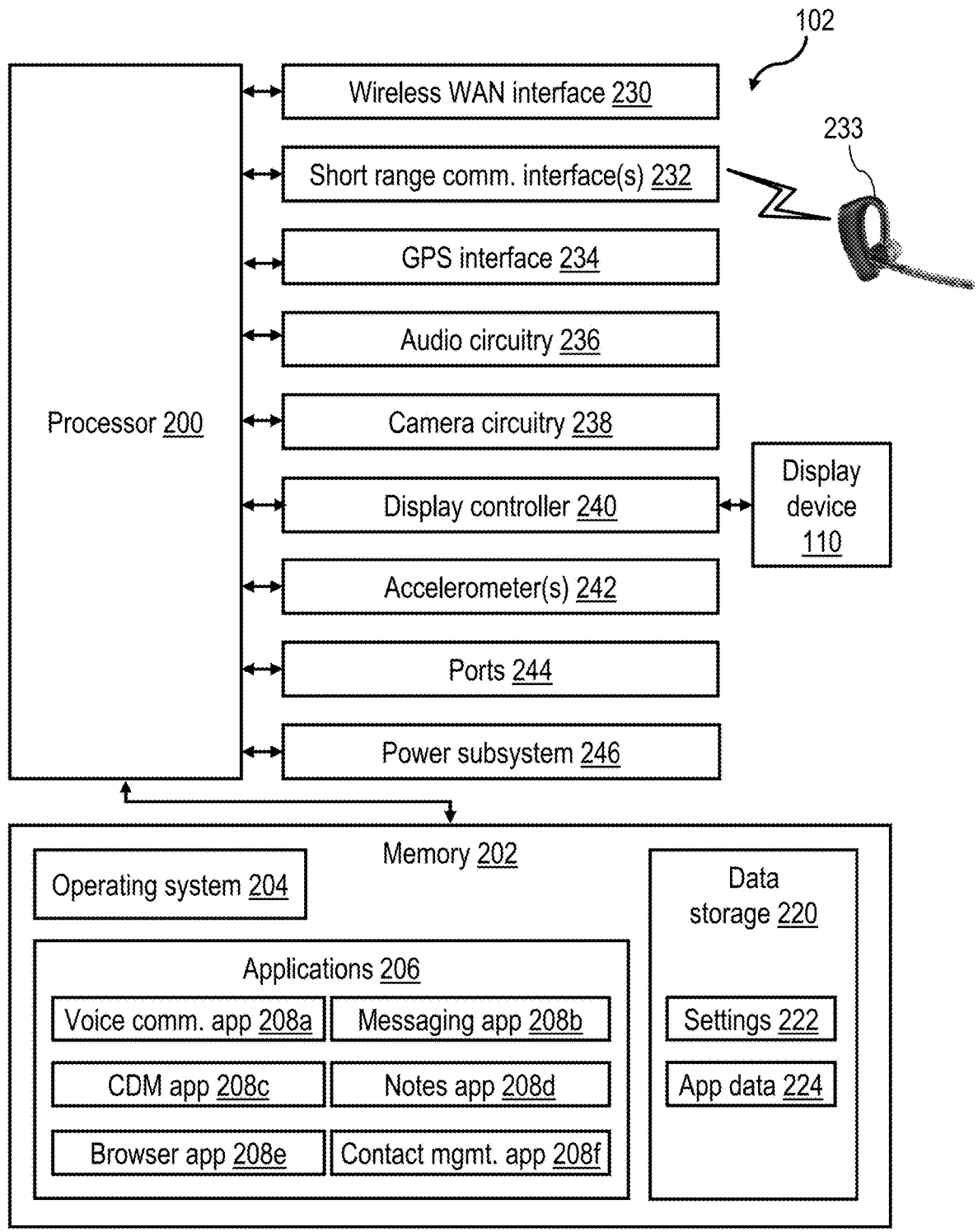
FIG. 2 is a block diagram of an electronic communication device in accordance with one embodiment.

In the illustrated embodiment, electronic communication device 102a may comprise, for example, a data processing system, such as a smartphone, smart watch, computer system (e.g., desktop, laptop, or tablet computer), display device (e.g., television set), video game console, etc. In each of these embodiments, electronic communication device 102a includes and/or is coupled to a display device 110, which may be (but is not required to be) a touch-sensitive display device. Electronic communication device 102a may optionally include one or more manually manipulable input buttons 120. Although not required, in the depicted example, electronic communication device 102a presents within display device 110 a graphical user interface including one or more icons 112a-112f, each of which may be selected by a user to invoke execution of a respective corresponding application by electronic communication device 102a. (Exemplary applications are illustrated in FIG. 2.) In the illustrated example, phone icon 112a corresponds to a voice communication application 208a (which may include video call capability, for example, as supported by Apple® FaceTime™), messaging icon 112b corresponds to a messaging (e.g., texting) application 208b, criteria-dependent messaging (CDM) icon 112c corresponds to a CDM application 208c, notes icon 112d corresponds to a notes (e.g., text editing) application 208d, browser icon 112e corresponds to a browser application 208e, and contacts icon 112f corresponds to a contact management application 208f. As is known in the art, electronic communication device 102a may execute multiple of these applications concurrently. Further, in some implementations, the functionality of multiple of these applications (e.g., voice communication application 208a, and/or messaging application 208b, and/or CDM application 208c, and/or notes application 208d) can be combined into a single application or implemented within a common application framework.

In some embodiments of electronic communication environment 100, one or more of electronic communication devices 102b, 102c may be implemented similarly to electronic communication device 102a. One or more of electronic communication devices 102b, 102c may alternatively or additionally be implemented as an intelligent device (e.g., vehicle or smart home controller) having an embedded processor. Network environments including such devices are sometimes referred to as the Internet of Things (IoT).

Referring now to FIG. 2, there is depicted a high-level block diagram of an exemplary implementation of an electronic communication device 102 in accordance with exemplary embodiments in which the electronic communication device 102 is implemented, for example, as a smartphone, desktop computer, laptop computer, tablet computer, or automotive computer. As illustrated, electronic communication device 102 includes a processor 200, which may include one or more processor cores for executing program code (e.g., software and/or firmware). As shown, processor 200 is coupled, either directly or indirectly, to a variety of different components within electronic communication device 102. For example, processor 200 is coupled to a memory 202 (e.g., dynamic random access memory (DRAM), static random access memory (SRAM), flash memory, and/or magnetic or optical disk drive, etc.), which provides electronic storage for data and program code (e.g., software and/or firmware) executed by processor 200. The program code stored within memory 202 includes an operating system 204, as well as applications ("apps") 206. As noted above, applications 206 include voice communication application 208a, messaging (texting) application 208b, CDM application 208c, notes (text editing) application 208d, browser application 208e, and contact management application 208f. In some embodiments, voice communication application 208a, messaging (texting) application 208b, notes application 208d, browser application 208e, and contact management application 208f can be (but need not be) conventional. CDM application 208c, which supports new electronic communication modalities, is described in detail below.

Data storage 220 within memory 202 may include input data and output data of the processing performed by processor 200. Data accessed and/or processed by applications 206 is referred to herein as application data 224. Data storage 220 may also store settings 222 that control and/or customize the operation of electronic communication device 102 and/or the program code it executes.

Electronic communication device 102 may include a number of additional components providing, supporting and/or expanding its processing, storage, and/or communication capabilities. For example, electronic communication device 102 includes a wireless WAN interface (e.g., a transceiver and antenna) 230 supporting two-way wireless radio frequency communication with communication network(s) 104. In order to support communication with other electronics within close range, electronic communication device 102 may be further equipped with one or more short range communication interface(s) 232, which may implement protocols for 802.11x, Bluetooth, 900 MHz communication or the like. As one exemplary use, short range communication interfaces may be utilized to interface input/output device(s), such as a Bluetooth headset 233, to electronic communication device 102. Electronic communication device 102 may further include a global positioning satellite (GPS) interface 234 (e.g., GPS receiver and GPS antenna) that receives GPS signals from GPS satellites and processes the GPS signals to provide location information to processor 200.

Electronic communication device 102 may also include audio circuitry 236 (e.g., at least an audio interface optionally further coupled to microphone(s) and speaker(s)), camera circuitry 238 (e.g., including one or more forward facing or rear facing cameras having still photo and/or video recording capabilities), and a display controller 240 for presenting video and/or image data via display device 110. Electronic communication device 102 may additionally include one or more accelerometers 242 that can be utilized by electronic communication device 102 to sense and/or determine the position, attitude, velocity, and/or acceleration of electronic communication device 102. One or more ports 244 may also optionally be utilized to expand the processing, communication and/or data storage capabilities of electronic communication device 102. Finally, electronic communication device 102 includes a power subsystem 246 that powers processor 200 and the other components of electronic communication device 102. Power subsystem 246 may include, for example, a battery and/or power port through which the battery may be charged from an AC power source or wireless inductive charging device.

Although FIG. 2 illustrates a number of components separately for ease of understanding, it will be appreciated by those skilled in the art that, in at least some embodiments, multiple of the illustrated components may be integrated within a common integrated circuit die or package.

Figure 3:
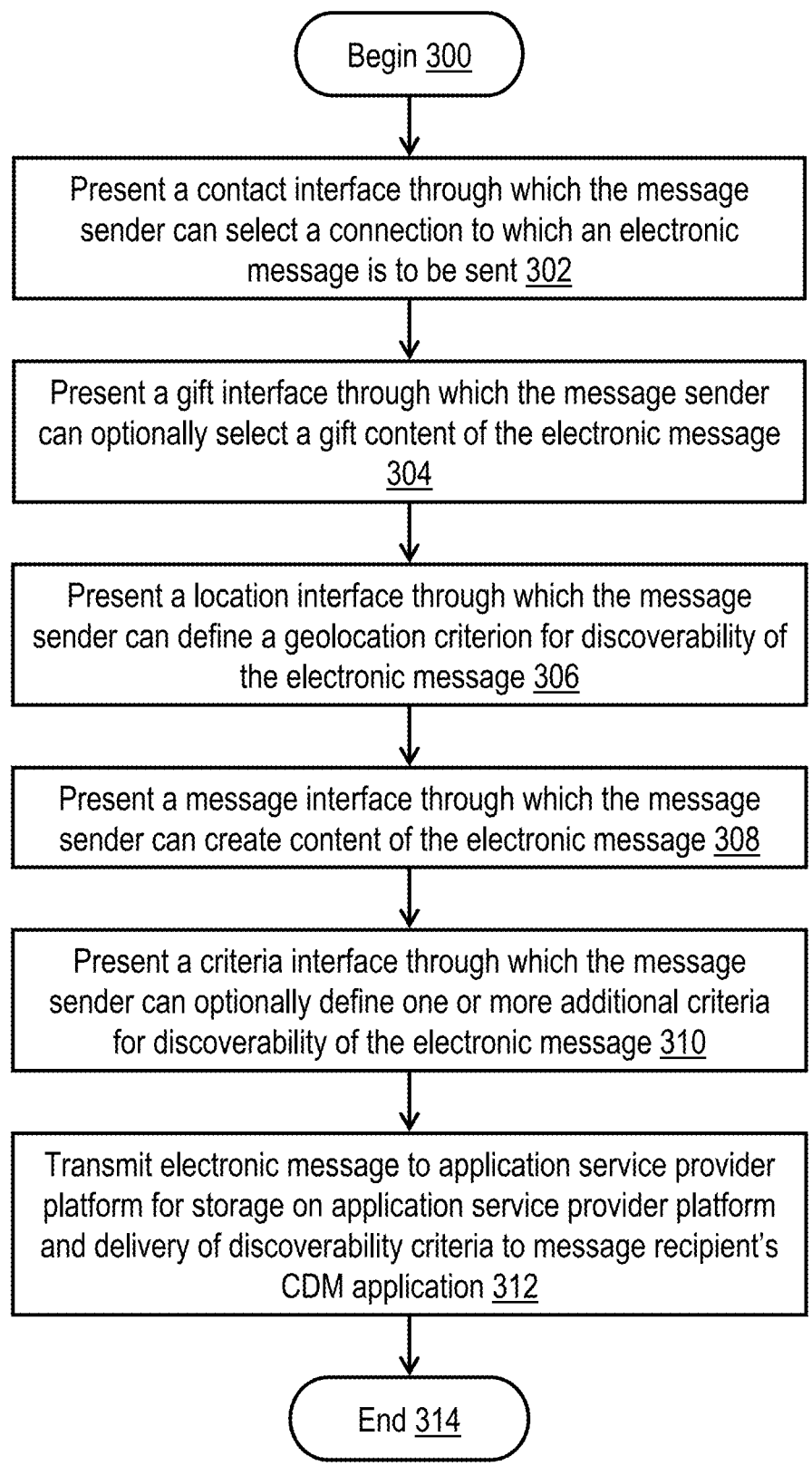
FIG. 3 is a high-level logical flowchart of an exemplary process by which an electronic communication device transmits an electronic message in accordance with one embodiment.

With reference now to FIG. 3, there is depicted a high-level logical flowchart of an exemplary process by which an electronic communication application transmits an electronic message in accordance with one embodiment. The illustrated process can be performed by a processor 200 of an electronic communication device 102 associated with a message sender, for example, in response to execution of CDM application 208c. To promote greater understanding, the process is described with reference to examples of graphical user interfaces given in FIGS. 4-9. It should be understood that the inventions described herein are not limited to the disclosed exemplary interfaces and can be realized utilizing many alternative interfaces.

Figure 4:
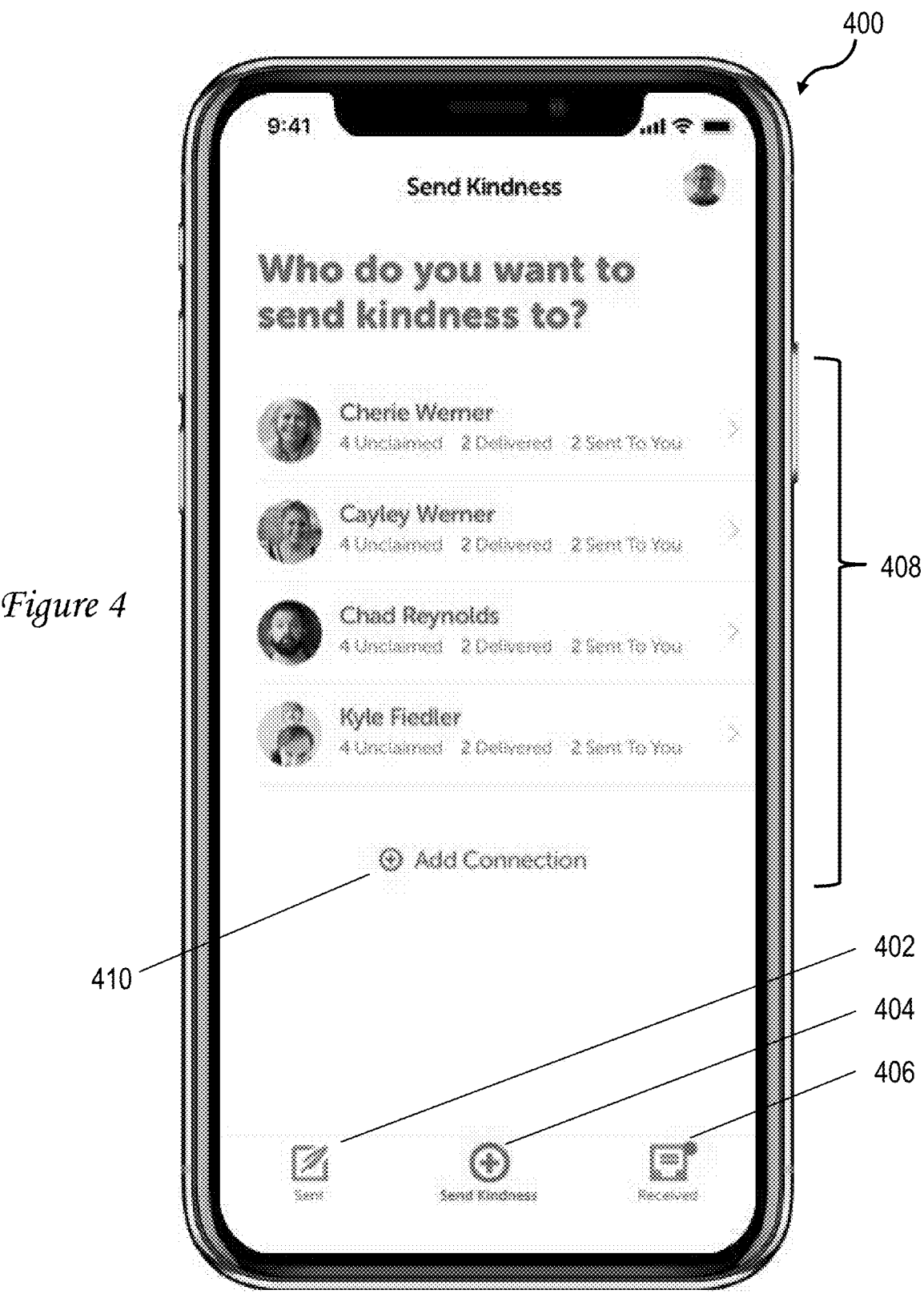
FIG. 4 depicts a first graphical user interface of a criteria-dependent messaging (CDM) application in accordance with one embodiment.

The process of FIG. 3 begins at block 300 and then proceeds to block 302, which depicts CDM application 208c presenting, within display device 110, a contact interface through which the message sender can select a connection to which an electronic message is to be sent via CDM application 208c. FIG. 4 depicts an exemplary graphical user interface 400 of CDM application 208c, which may, for example, may be presented by electronic communication device 102 within display device 110 in response to a user selection of CDM icon 112c. Graphical user interface 400 provides controls 402, 404, and 406, which respectively permit a user to review any prior electronic messages transmitted by the user via CDM application 208c, to initiate creation of a new electronic message to be transmitted via CDM application 208c, and to initiate presentation of electronic messages received by CDM application 208c, including discoverable electronic message(s), if any. In addition, graphical user interface 400 includes a connections field 408 in which the user can view "connections" (e.g., other users of CDM application 208c) with whom the user can communicate electronically via CDM application 208c. As indicated, the user has the option of adding connections to those listed in connections field 408, for example, utilizing control 410. In some embodiments, the addition of a connection can entail sending an invitation electronic message (e.g., via email, text messaging, or social media post) that invites the prospective connection to "connect" with the user via CDM application 208c. Additionally, in some embodiments, the user can automatically populate connections field 408 with pre-existing connections or contacts recorded by other applications, such as voice communication application 208a, messaging application 208b, and/or contact management application 208f.

Assuming selection of the first displayed connection "Cherie Werner" (e.g., via a touch-sensitive display device 110) listed in connections field 408, electronic communication device 102 can present a gift interface through which the user, acting in the role of a message sender, can optionally select a gift content of an electronic message, as shown at block 304 of FIG. 3.

Figure 5:
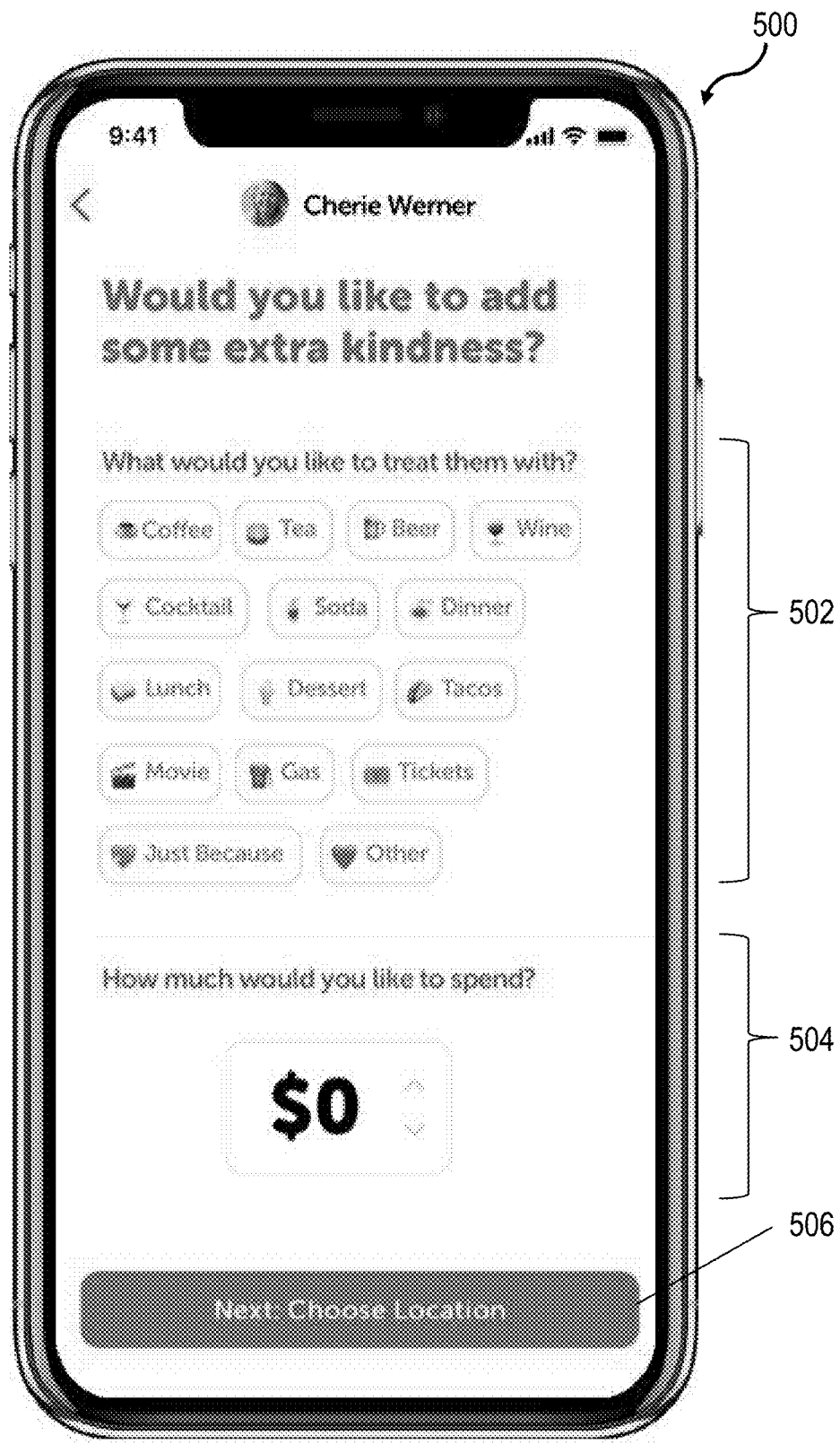
FIG. 5 illustrates a second graphical user interface of a CDM application in accordance with one embodiment.

With reference now to FIG. 5, there is depicted exemplary graphical user interface 500 of CDM application 208c, which provides a gift interface. In this example, graphical user interface 500 includes a category field 502 through which a message sender can browse and specify a category of goods or services, if any, from which the message sender wants to make a gift to a message recipient. In some embodiments, category field 502 may specify a financial currency. In some embodiments, category field 502 may optionally designate or order the presentation of categories within category field 502 to indicate one or more "favorites" pre-specified via CDM application 208c by the message recipient selected from connections field 408. The "favorites" can include specific types or categories of gifts (e.g., coffee, dessert, money, etc.), specific vendors (e.g., restaurants, bars, theaters, coffee shops, etc.), and/or particular item(s) (e.g., a cappuccino, a dozen red roses, etc.). CDM application 208c can additionally customize the presentation of "favorites" within category field 502 to feature "favorites" that the message recipient has received less recently and/or less frequently.

Graphical user interface 500 additionally includes an amount field 504 through which the user can specify an amount of the goods/services, for example, in terms of a financial currency (including a cryptocurrency) or in terms of the goods/services (e.g., 2 movie tickets, 1 car wash, 1 dessert, etc.). It should be appreciated that the specification of a category of goods/services and the amount is optional and that, in at least some embodiments, the delivery of the electronic message is not conditioned on the specification of any goods/services or an amount. It should also be appreciated that the goods/services or other gift need not be provided by (and can be independent of) a vendor located at a geolocation specified in a recipient geolocation criterion (as discussed below with reference to FIG. 6). Thus, the message sender could utilize graphical user interface 500, for example, to specify the delivery of flowers by a florist to a restaurant at which a message recipient is to dine in celebration of an anniversary. In at least some embodiments, graphical user interface 500 may include an additional amount control that allows the message sender to designate that the initial amount specified in amount field 504 is to be automatically increased up to a limit or decreased down to a limit based on the time elapsed between the sending of the electronic message by the message sender and discovery of the electronic message by the message recipient.

In association with the transmission, communication, and/or discovery of an electronic message that specifies a non-zero amount in amount field 504, CDM application 208c and/or application service provider platform 116 debits a financial account of the message sender in a debit amount based on the amount specified in amount field 504. For example, the debit amount can be equal to the currency amount or price of goods/services specified in amount field 504. In some embodiments, the debit amount can be greater (e.g., reflecting a service fee charged by application service provider platform 116) or less than the currency amount or price of goods/services specified in amount field 504 (e.g., reflecting a discount provided by application service provider platform 116 or a vender of goods/services). In some embodiments, application service provider platform 116 additionally credits a financial account of the message recipient (or an account of a vendor of the goods/services) in an amount based on the amount specified in amount field 504. Again, this credit amount can be equal to, greater than, or less than the currency amount or price of goods/services specified in amount field 504. The setup and maintenance of the financial accounts of the message sender, message recipient, and vendor and the associated debits and credits can be performed, for example, by application service provider platform 116 or a third-party financial platform (e.g., PayPal).

Referring again to FIG. 5, in the illustrated embodiment, graphical user interface 500 further includes a control 506 that, when selected, can cause CDM application 208c to end processing at block 304 of FIG. 3 and to proceed to the processing depicted at block 306. At block 306, CDM application 208c presents to the message sender a location interface through which the message sender can define a geolocation criterion for discoverability of the electronic message.

Figure 6:
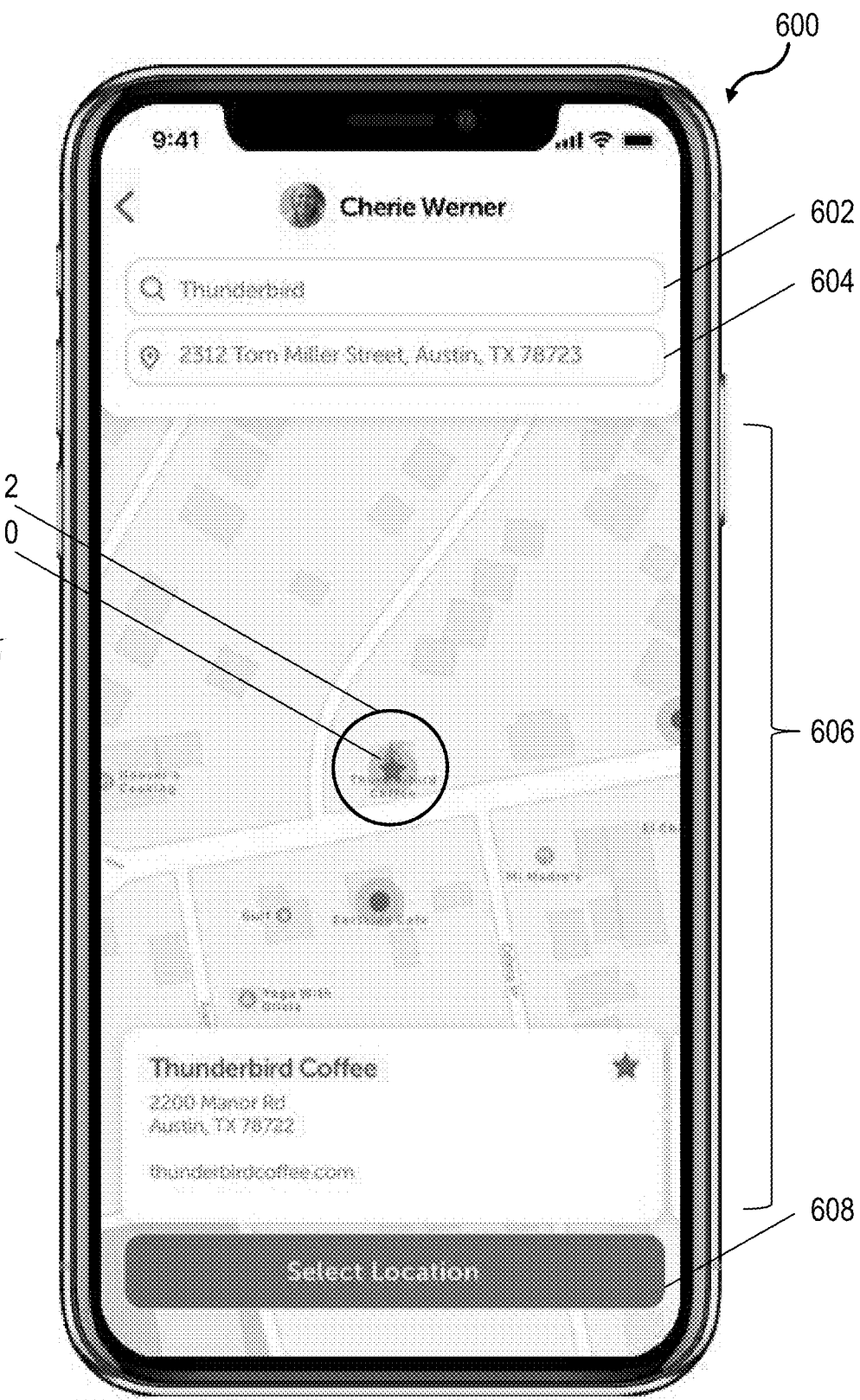
FIG. 6 depicts a third graphical user interface of a CDM application in accordance with one embodiment.

Referring now to FIG. 6, there is depicted an exemplary graphical user interface 600 of CDM application 208c that provides a location interface. As noted, graphical user interface 600 enables the user to begin specification of one or more discoverability criteria for the electronic message. Specifically, in the depicted embodiment, graphical user interface 600 enables the message sender to specify a geolocation of the message recipient upon which discoverability of the electronic message is conditioned. In order to facilitate specification of a recipient geolocation criterion, graphical user interface 600 includes a search field 602 into which the message sender can enter, for example, by voice input or typing, one or more search terms, which can include, for example, textual terms (e.g., the name of a country, state, city or subdivision thereof, street name, a category of good/service, and/or business name, etc.) and/or geo-coordinates. The textual terms can in some embodiments be qualified by the category or categories selected in category field 502.

Based at least in part on the input, if any, entered into search field 602, CDM application 208c graphically presents in a map field 606 one or more candidate geolocations corresponding (or determined by a web search engine to correspond) to the input. As will be appreciated, the graphical presentation of geolocations within map field 606 can be accomplished, for example, by accessing a third-party mapping service (e.g., Google Maps) and/or by accessing mapping data from application service provider platform 116. To aid in selection of a recipient geolocation from among one or more candidate geolocations displayed in map field 606, a street address and/or set of geo-coordinates corresponding to a given one of the candidate geolocations (i.e., a "focused geolocation") can be presented in location field 604. If the initial focused geolocation proposed by CDM application 208c or the portion of the map initially presented within map field 606 does not correspond to a geolocation that the message sender desires to view, the message sender can preferably resize, zoom, pan, and otherwise interact with the map view presented in map field 606 to cause other candidate geolocation(s) to be alternatively presented within map field 606 and chosen as the focused geolocation 610.

In some embodiments, CDM application 208c may have access to the message recipient's current or recent geolocation, for example, from application service provider platform 116 or a third-party service (e.g., the Find Friends functionality available on iOS). In such cases, CDM application 208c may initially present within map field 606 a map view including the message recipient's current or recent geolocation. In some embodiments, CDM application 208c may alternatively initially present within map field 606 a map view including the message sender's current or recent geolocation.

In at least one embodiment, the user may additionally resize a geographical boundary (or "geofence") 612 about the focused geolocation that is utilized by CDM application 208c to determine if a message recipient is to be considered "at" the focused geolocation. For example, if display device 110 is a touchscreen display, the user may use conventional pinching and/or pulling gestures to resize geofence 612 (e.g., a circular or rectangular boundary) about the focused geolocation. In many cases, it may be desirable for the message sender to set the size of geofence 612 to be larger in area than the area identified by default as the focused geolocation by CDM application 208c and/or the third-party mapping service. By doing so, a visit by a message recipient to the focused geolocation is more likely to be detected by CDM application 208c, given the inherent limits to the precision of determining of geolocation of an electronic communication device 102, particularly when located inside a building or vehicle or otherwise lacking an unobstructed view of the sky.

Once the message sender is satisfied with the current focused geolocation, the message sender can select a location selection control 608 presented in conjunction with map field 606 to select the focused geolocation as a recipient geolocation criterion for discoverability of the electronic message. In response to selection of location selection control 608, CDM application 208c ends processing at block 306 of FIG. 3 and initiates processing at block 308, which illustrates CDM application 208c presenting a message interface through which the message sender can create content of the electronic message, as discussed below with reference to FIG. 7.

In various embodiments and/or use cases and/or configurations of CDM application 208c, the geolocation criterion or criteria may have different or additional associated parameters. For example, in some embodiments or configurations, the recipient geolocation criterion is not considered satisfied if both the message sender and message receiver are deemed to be "together" (e.g., within a predetermined or user-selected geographical proximity, which in some embodiments may correspond to geofence 612). As noted above, in some embodiments or configurations, CDM application 208c may find the recipient geolocation criterion satisfied if the message recipient is within a predetermined or user-defined geofence about the recipient geolocation criterion. In some embodiments or configurations, the geographical area within the geofence may be relatively small, for example, surrounding a given venue by an area approximating the maximum expected error of GPS interface 234. In other embodiments or configurations, the size of the geofence may be much larger and may span a city, state, or country. Further, in some embodiments, the recipient geolocation criterion is only satisfied if the recipient is within the geofence for at least a predetermined minimum time, thus allowing a "visit" to a venue to be distinguished from, for example, merely driving or walking by the venue.

Figure 7:
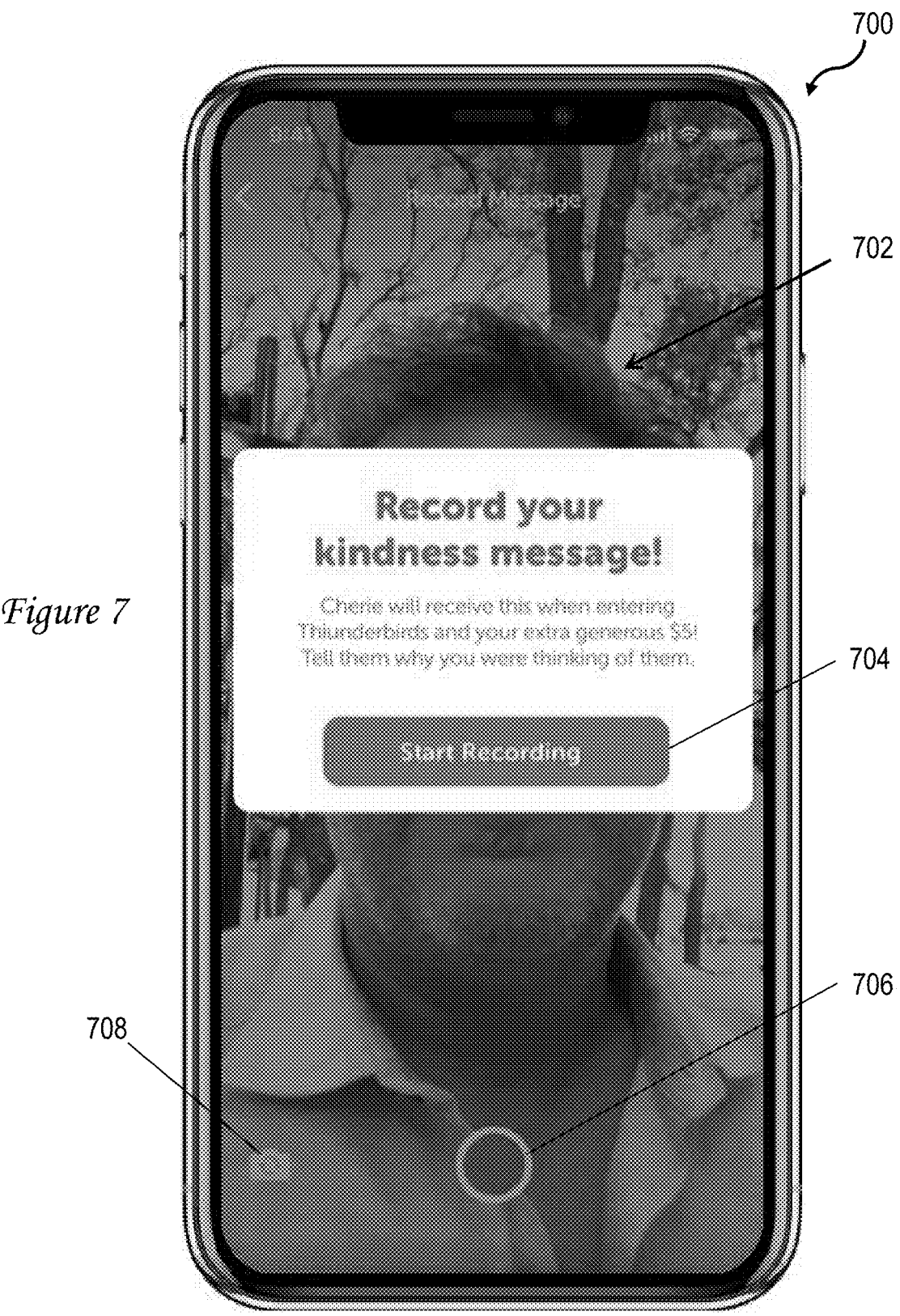
FIG. 7 illustrates a fourth graphical user interface of a CDM application in accordance with one embodiment.

With reference now to FIG. 7, there is illustrated an exemplary graphical user interface 700 of CDM application 208c which provides a message interface through which the message sender can create the content of an electronic message, as depicted at block 308 of FIG. 3. In the exemplary embodiment of CDM application 208c described herein, user selection of location selection control 608 in FIG. 6 automatically turns on a front facing camera of the message sender's electronic communication device 102 and causes CDM application 208c to present exemplary graphical user interface 700. Thus, in this example, the user is immediately presented with a dynamic video image 702 captured by the front facing camera (e.g., a live video view of the user's face), as well as one or more recording controls 704, 706 that enable the user to start and stop recording of video content of the electronic message. Graphical user interface 700 additionally includes a camera selection control 708 that enables the user to switch, if desired, between the use of forward facing and rear facing cameras to record the video content of the electronic message. It will be appreciated by those skilled in the art that graphical user interface 700 (and/or one or more other screens) may alternatively or additionally include other controls that allow the user to create other types of electronic message content, including, without limitation, textual content, audio content, graphics, hyperlinks, emojis, data files, etc. In some embodiments, the user may opt to communicate one or more of these other types of electronic message content in lieu of, or in addition to, the video content.

In some cases, the message sender may want to create content for an electronic message that conveys a specific message and/or emotion, but may desire assistance in formulating the message. To provide this assistance, graphical user interface 700 can be augmented to include a library control that, if selected, causes a library of selectable message prompts to be presented for browsing and/or selection within graphical user interface 700. Based on selection of one of the message prompts by the message sender, CDM application 208c can present a textual message prompt within graphical user interface 700 while capturing, via an input device (e.g., the rear facing video camera, the forward facing video camera, and/or microphone), a message including audio and/or video data. In this manner, the message sender can read the textual message prompt while recording the electronic message. In some cases, the message prompt may further include a prerecorded audio track (e.g., a music track available from CDM application 208c, electronic communication device 102, or a third-party service (e.g., Spotify, Pandora, etc.)). In some cases, CDM application 208c may mark within the library and/or remove from the library message prompts that have been used by the message sender. In at least some embodiments, CDM application 208c may automatically truncate and/or compress the electronic message to fit within a predetermined time duration or data size.

In the depicted example, user selection of recording control 706 to stop recording of the video content of the electronic message automatically causes electronic communication device 102 to end processing at block 308 of FIG. 3 and initiate the processing illustrated at block 310. As indicated, at block 310 of FIG. 3, CDM application 208c presents to the user via display device 110 a criteria interface through which the message sender can optionally define one or more additional or alternative discoverability criteria for the electronic message.

Figure 8:
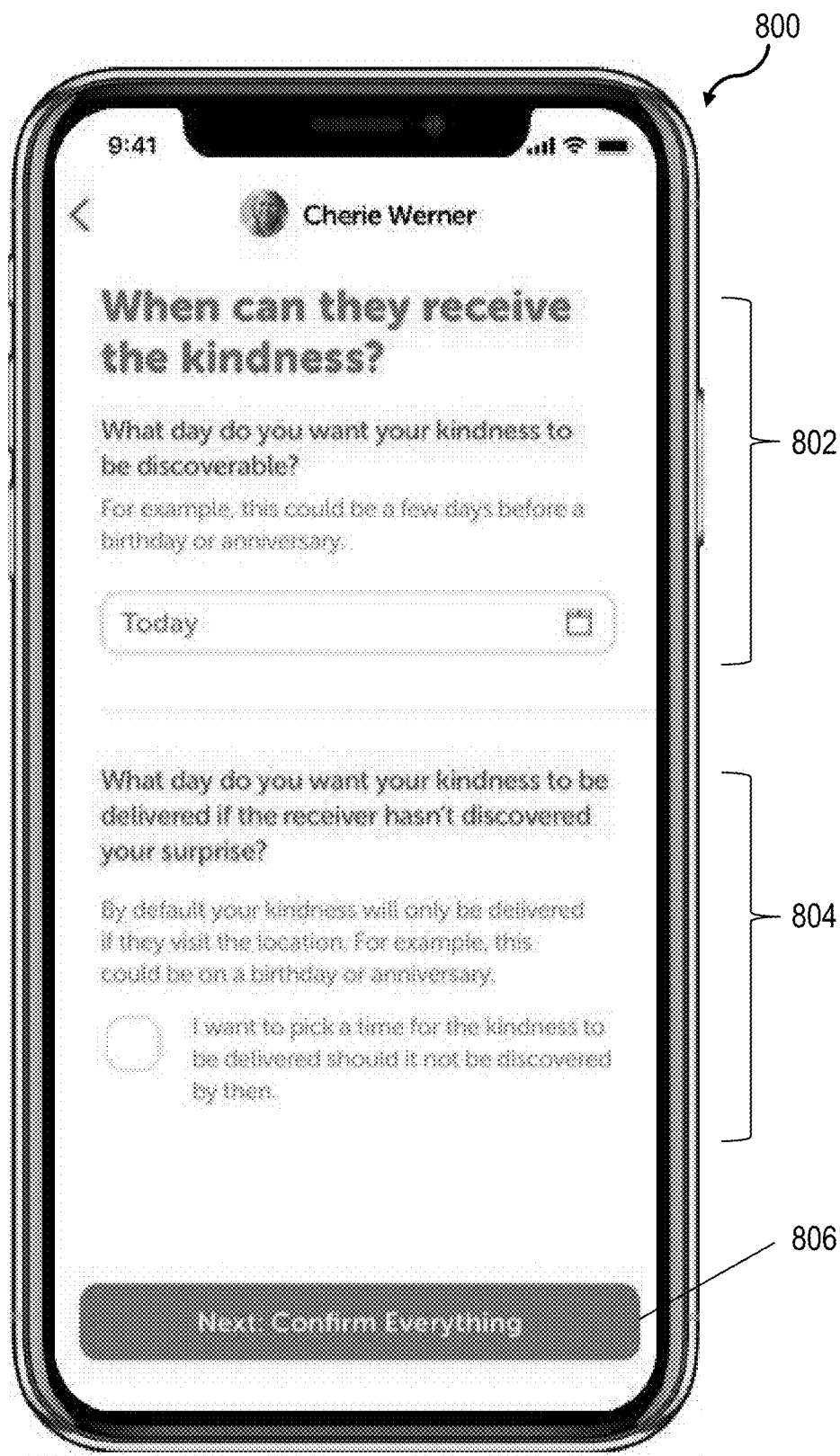
FIG. 8 depicts a fifth graphical user interface of a CDM application in accordance with one embodiment.
Figure 9:
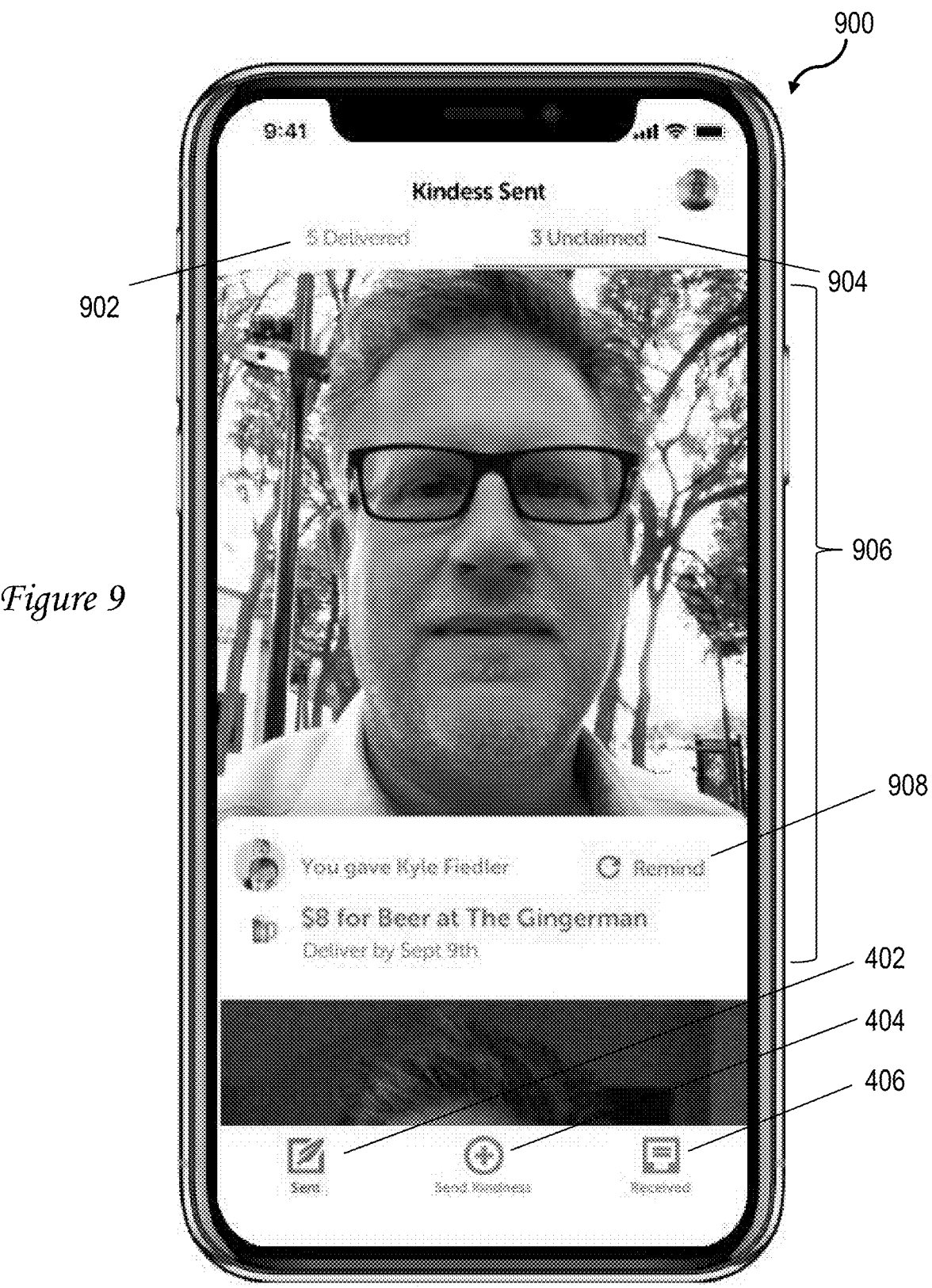
FIG. 9 illustrates a sixth graphical user interface of a CDM application in accordance with one embodiment.

Referring now to FIG. 8, there is depicted a graphical user interface 800 that may be utilized to provide a criteria interface in accordance with one embodiment. In at least one embodiment, CDM application 208c presents graphical user interface 800 via display device 110 in response to user selection of recording control 706.

In the depicted example, graphical user interface 800 includes one or more fields that permit the message sender to establish, if desired, one or more criteria for the discoverability of the electronic message in addition to or in place of a recipient geolocation. For example, in time field 802, the message sender can establish one or more chronological time(s) at which the electronic message is discoverable. In various embodiments and/or configurations, these times(s) can be specified by calendar date or date range(s), and/or day of the month or week, and/or time(s) of day. In addition, in discoverability exception field 804, the message sender can specify whether or not (and when) the electronic message is to be delivered to the message recipient despite all the discoverability criteria having not been met. In some embodiments, time field 802 or discoverability exception field 804 can additionally be utilized to define an expiration date for discovery of the electronic message. If the expiration date passes without the discoverability criteria (or an exception) being met, the content of the electronic message is not delivered to the message recipient.

In some embodiments, the discoverability of the electronic message can alternatively or additionally be conditioned on the recipient geolocation being located within a geofence about any one of multiple different geolocations. These discoverability criteria can be used to enable discoverability of the electronic message, for example, based on the message recipient visiting any of five designated venues or three designated cities.

In some embodiments, the discoverability of a single electronic message can alternatively or additionally be conditioned on the first of multiple different message recipients satisfying all discoverability criteria. For example, utilizing an "Easter egg" mode, the message sender could designate a single electronic message to be discoverable by the first of multiple friends to satisfy a recipient geolocation criterion. In some embodiments, once the electronic message has been discovered by one of the multiple friends, the electronic message (or at least a gift portion of the electronic message) is not discoverable by any other of the multiple friends.

In some embodiments, the discoverability of an electronic message can alternatively or additionally be conditioned on the satisfaction of a second criterion at a specified time interval relative to the satisfaction of a first criterion. For example, an electronic message (e.g., communicating a gift of a dessert purchase) can be made discoverable if a geolocation criterion (e.g., a friend's favorite restaurant) is still satisfied 30 minutes after that geolocation criterion was first satisfied by the message recipient.

In some embodiments, the discoverability of each electronic message in a set of multiple electronic messages can be linked in a sequence by multiple discoverability criteria. For example, the message sender can configure multiple electronic messages to be delivered in a specific order using geolocation criteria to specify the order of message discovery. Thus, a message sender can specify discovery of a first electronic message if the message recipient is within a geofence about cafe1, where the first electronic message indicates that the message recipient is to enjoy a first gift (e.g., a $5 coffee credit) then proceed to cafe2. When the message recipient arrives within a geofence about cafe2, a second electronic message may indicate that the message recipient is to receive a second gift (e.g., a $10 appetizer) and then proceed to cafe3. This process can continue to any desired number of electronic messages and delivery criteria.

In some embodiments, the discoverability of an electronic message can alternatively or additionally be conditioned on the satisfaction of a location proximity criterion. For example, the location proximity criterion may require that the message sender (or another connection within CDM application 208c) and the message recipient are both located within a selected geofence in order for the content of the electronic message to be discoverable. As another example, the location proximity criterion may require that the message sender and message recipient are not both located within a selected geofence in order for the content of the electronic message to be discoverable.

In some embodiments, the discoverability of the content of an electronic message can alternatively or additionally be conditioned on the satisfaction of a precedence criterion. For example, in one implementation, a precedence criterion can be utilized by a message sender to specify that an electronic message for a message recipient is discoverable by the message recipient at a particular geolocation only if no other electronic message of any message sender utilizing CDM application 208c is currently discoverable by that same message recipient at the same geolocation. As another example, the precedence criterion can be utilized by a message sender to specify that the electronic message is discoverable by the message recipient at a geolocation only if the message recipient has no undiscovered electronic messages by the same message sender that were sent earlier in time. In some embodiments, the precedence criterion may provide the capability for the message sender to ensure (e.g., through an additional "premium delivery" fee) that the message sender's electronic message is delivered first when the message recipient is entering a geolocation in which the message recipient has or may have multiple discoverable electronic messages waiting from different message senders.

In some embodiments, graphical user interface 700 can alternatively or additionally permit the user to specify alternative or even custom discoverability criteria. In some cases, these discoverability criteria may relate directly to the message sender (e.g., geolocation of electronic communication device 102, whether the message sender has CDM application 208c running on electronic communication device 102, a bank balance of message sender, etc.). In other cases, the discoverability criteria may be independent conditions and/or events, such as a specified sports team winning a particular game.

If the message sender is satisfied with the inputs made via graphical user interface 800, the message sender can select control 806, which causes CDM application 208c to end processing at block 310 of FIG. 3 and to optionally present, to the message sender, an additional unillustrated graphical user interface that enables the user to review and to confirm the content of the electronic message and its associated discoverability criteria. Once confirmed by the message sender (e.g., by selection of a "Send" control), the electronic message and its associated discoverability criteria are transmitted by the CDM application 208c executing on the electronic communication device 102 of the message sender. Thus, in at least some embodiments, the transmission of the electronic message is unconditional, and the discoverability of the electronic message is conditional. As a consequence, the message sender at electronic communication device 102 can immediately review the electronic message from the collection of "Sent" electronic message by selecting control 402, for example, in graphical user interface 900 of FIG. 9. To facilitate review of "Sent" electronic messages, graphical user interface 902 can provide separate display of undiscovered electronic messages (under tab 904) and discovered electronic messages (under tab 902). A summary view of the content of a selected electronic message is provided within message content field 906.

In a strictly peer-to-peer implementation, the electronic message and its associated discoverability criteria are transmitted directly from electronic communication device 102 to the CDM application 208c executing on an electronic communication device 102 of the intended message recipient. Although in this case the data representing the electronic message and its associated discoverability criteria are physically stored at the electronic communication device 102 of the message recipient, receipt of the data by electronic communication device 102 is generally "silent" in that the content of the electronic message and the discoverability criteria are not visible or discoverable to the message recipient based merely upon receipt by the electronic communication device 102 or its CDM application 208c (the "receiving CDM application").

In embodiments in which application service provider platform 116 is utilized to facilitate communication between electronic communication device 102, electronic communication device 102 may transmit the electronic message and its associated discoverability criteria to service provider platform 116, which thereafter relays the electronic message and its associated discoverability criteria to the receiving CDM application 208c executing on the electronic communication device 102 of the message recipient. In some embodiments, service provider platform 116 does not monitor for satisfaction of the discoverability criteria of the electronic message and simply forwards the electronic message to receiving CDM application 208c. In other embodiments, service provider platform 116 receives geolocation information from the message recipient's electronic communication device 102 (and possibly other recipient-related information) and is therefore able to monitor for satisfaction of the discoverability criteria of the electronic message and forwards the content of the electronic message to receiving CDM application 208c upon satisfaction of some or all of the message discoverability criteria.

In embodiments employing peer-to-peer communication or those employing application service provider platform 116, receiving CDM application 208c, while not disclosing the content of the electronic message and the discoverability criteria to the message recipient prior to satisfaction of the discoverability criteria (or an exception), may generally indicate that an electronic message is waiting to be discovered, for example, by modifying the visual appearance of control 306. In this way, the message recipient has awareness of the existence of an electronic message awaiting discovery, increasing engagement with CDM application 208c.

In at least some embodiments, engagement of message senders and message recipients with CDM application 208c can also be encouraged by CDM application 208c enabling the message sender to send textual, audio, and/or video hints regarding the criterion or criteria upon which discoverability of an electronic message to the message recipient depends. In some embodiments, these hints can take the form of a private real-time chat stream between the message sender and message recipient. The message sender may initiate the sending of a hint to the message recipient, for example, through selection of reminder control 908.

Figure 10:
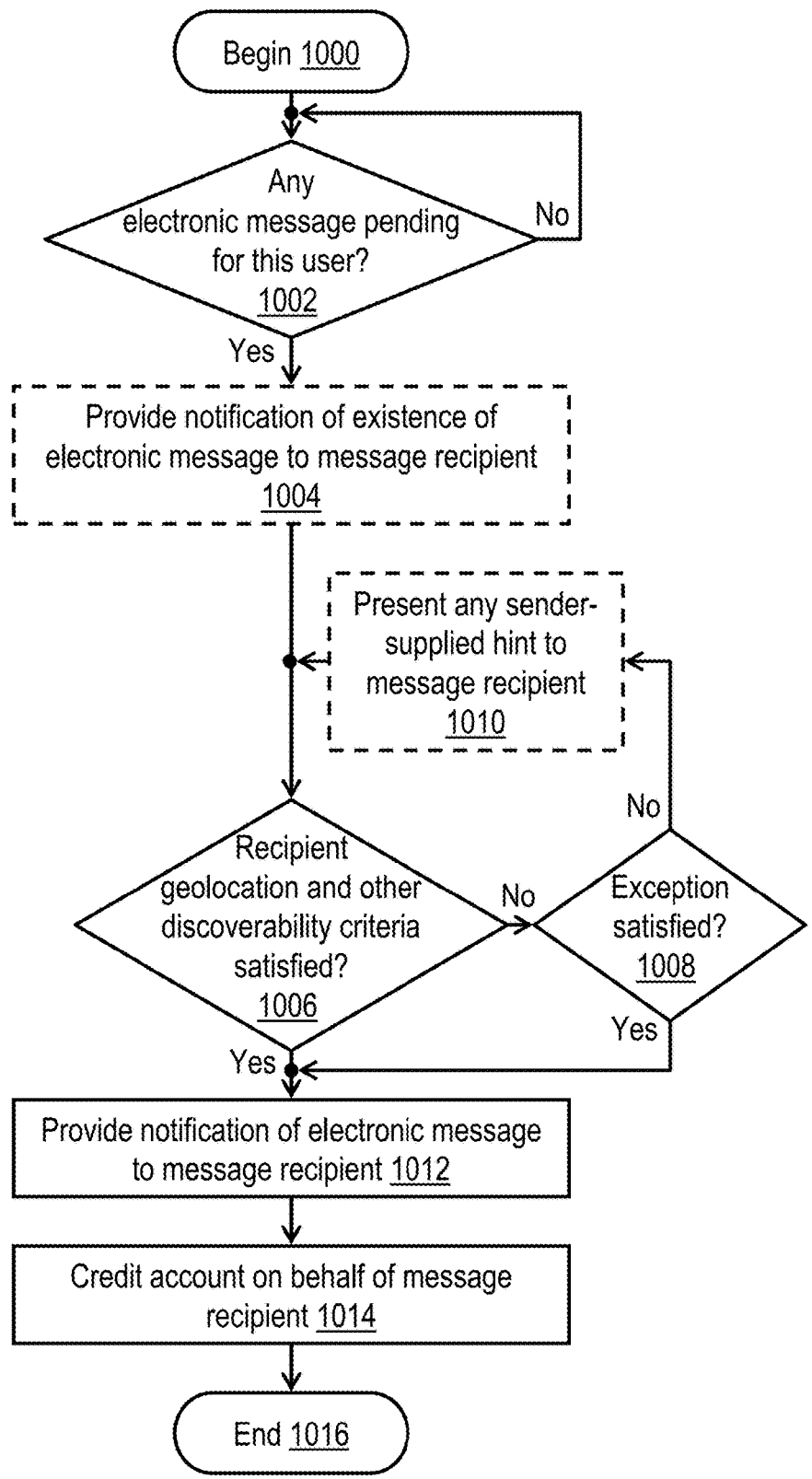
FIG. 10 is a high-level logical flowchart of an exemplary process by which a processor makes an electronic message discoverable in accordance with one embodiment.

Referring now to FIG. 10, there is depicted a high-level logical flowchart of a discovery process by which a message recipient discovers an electronic message. The illustrated process can be performed by the processor of the message recipient's electronic communication device 102 (e.g., mobile device) and/or the processor of application service provider platform 116. Thus, although reference is made herein to a "processor," it will be appreciated that the processing may be distributed across multiple physical processors, potentially located in different physical platforms. It should be appreciated that an instance of the process of FIG. 10 can be executed for each message recipient to which CDM application 208c may communicate electronic message.

The process of FIG. 10 begins at block 1000 and then proceeds to block 1002, which illustrates the processor determining whether or not any electronic message has been sent to a particular user as a message recipient. If not, the process iterates at block 1002. If a determination is made at block 1002 that an electronic message has been sent to the particular user as a message recipient, the processor may optionally provide, via the receiving CDM application 208c or the operating system 204 of the message recipient's electronic communication device 102, a notification to the message recipient that an electronic message is available to be discovered. In some embodiments, this notification of message existence can include, for example, a textual OS notification on the lock screen of a mobile device, a modification of the appearance of CDM icon 112c, a posting to a social media platform, an email message, etc.

At block 1006, the processor determines whether or not all discoverability criteria for the electronic message, including any recipient geolocation criterion or criteria, have been satisfied. If so, the process of FIG. 10 proceeds to block 1012, which is described below. If not, the processor may further determine at block 1008 if a discoverability exception, if any, for the electronic message has been satisfied. If so, the process of FIG. 10 proceeds to block 1012, which is described below. If not, the processor does not present the content of the electronic message to the message recipient. However, the processor may present any new sender-supplied hint regarding the electronic message to the message recipient, as shown in optional block 1010. The process then returns to block 1006, which has been described.

Referring now to block 1012, the processor provides notification of the electronic message and/or its content to the message recipient, for example, utilizing a notification capability of the receiving CDM application 208c and/or operating system 204 of the message recipient's electronic communication device 102. In addition, at block 1014 the processor credits an account of the message recipient with a monetary amount corresponding to the amount, if any, specified by the message sender in amount field 504. (A corresponding debit of an account of the message recipient can also be made based on discovery of the electronic message by the message recipient.) Thereafter, the process of FIG. 10 ends at block 1016.

Figure 11:
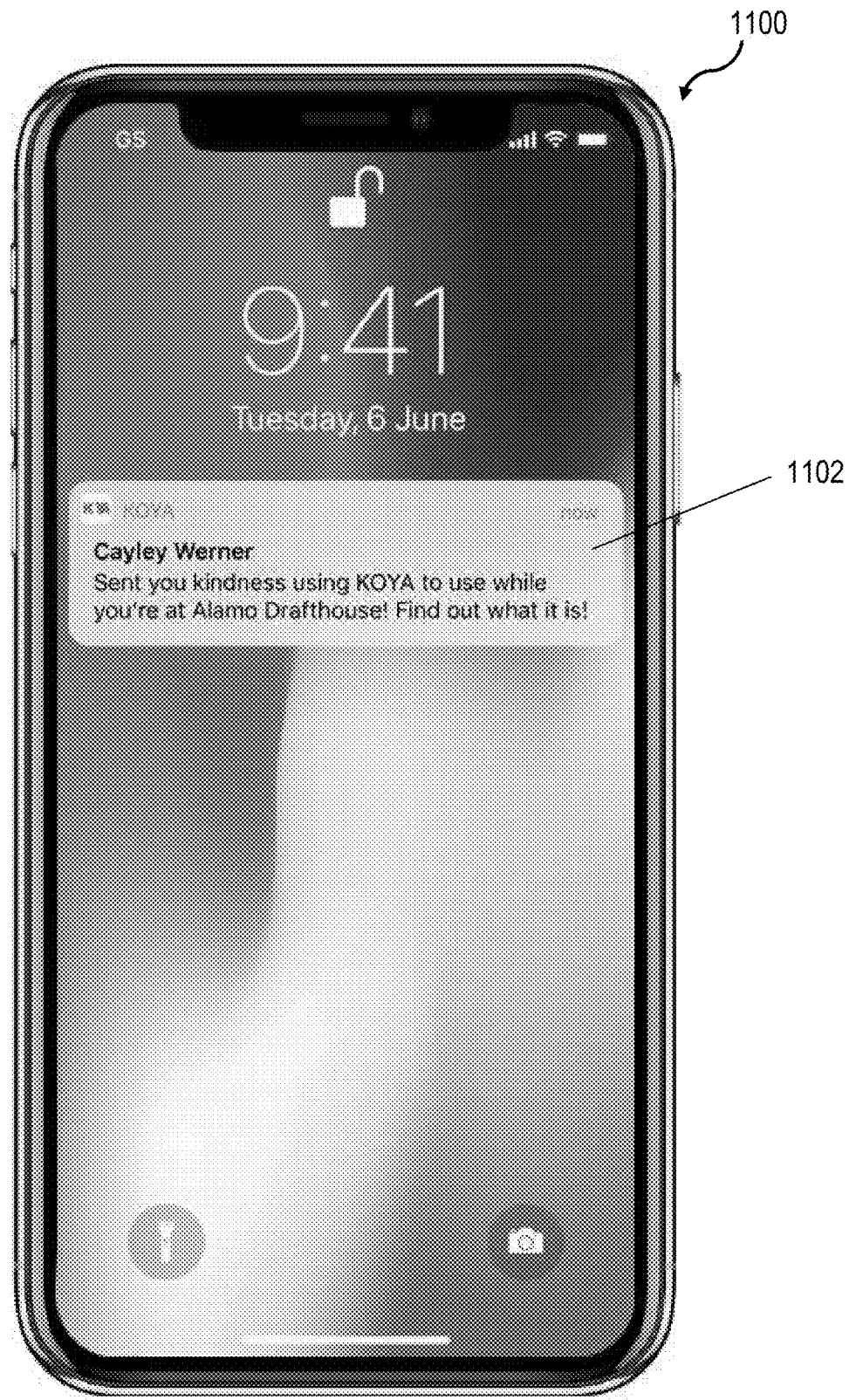
FIG. 11 illustrates an exemplary notification of an electronic message communicated by an electronic communication application in accordance with one embodiment.

With reference now to FIG. 11, an exemplary notification of an electronic message communicated by an electronic communication application in accordance with one embodiment is illustrated. In this example, a processor executing receiving CDM application 208c and/or a processor of application service provider platform 116 has determined that all of the discoverability criteria associated with an electronic message have been satisfied, as discussed with respect to block 1006 of FIG. 10. Accordingly, the receiving CDM application 208c presents, via operating system 204 of the electronic communication device 102, a notification 1102 of the electronic message on the lock screen of electronic communication device 102, as depicted at block 1012 of FIG. 10. Of course, this notification can alternatively or additionally be provided utilizing other techniques, such as via an email message, text message, calendar invitation, social media post, and/or a presentation within CDM application 208c.

Figure 12:
FIG. 12 depicts a seventh graphical user interface of a CDM application in accordance with one embodiment.

In the depicted embodiment, user selection of notification 1102 in graphical user interface 1000 causes the message recipient's electronic communication device 102 to invoke (if not already executing) the execution of receiving CDM application 208c and to cause the receiving CDM application 208c to present to the message recipient via display device 110 the exemplary graphical user interface 1200 of receiving CDM application 208c given in FIG. 12. In this example, graphical user interface 1200 of the receiving CDM application 208c includes a presentation field 1202 in which the receiving CDM application 208c automatically initiates presentation of audio, video, graphical, and/or other content of the discovered electronic message (e.g., in this case, video content recorded by the message sender). Graphical user interface 1200 additionally includes a textual field 1204 that identifies the message sender (together with an accompanying profile photo) and summarizes textual content of the electronic message. Graphical user interface 1200 further includes a response control 1206 that, if selected, initiates a flow through which the message recipient can respond to the electronic message, for example, with a responsive electronic message containing video, audio, text, graphics, hyperlinks, and/or file(s), etc. In some embodiments, some or all of the textual contents of the responsive electronic message may be predetermined or pre-populated and accessible for user editing. In other embodiments, the responsive electronic message may alternatively or additionally include video content recorded utilizing the front facing camera of the electronic communication device 102. In at least some embodiments, this video content may include a brief video clip (i.e., reaction shot) of the message recipient captured by CDM application 208c utilizing the front facing video camera of the electronic communication device 102 when the electronic message is presented to the message recipient.

Figure 13:
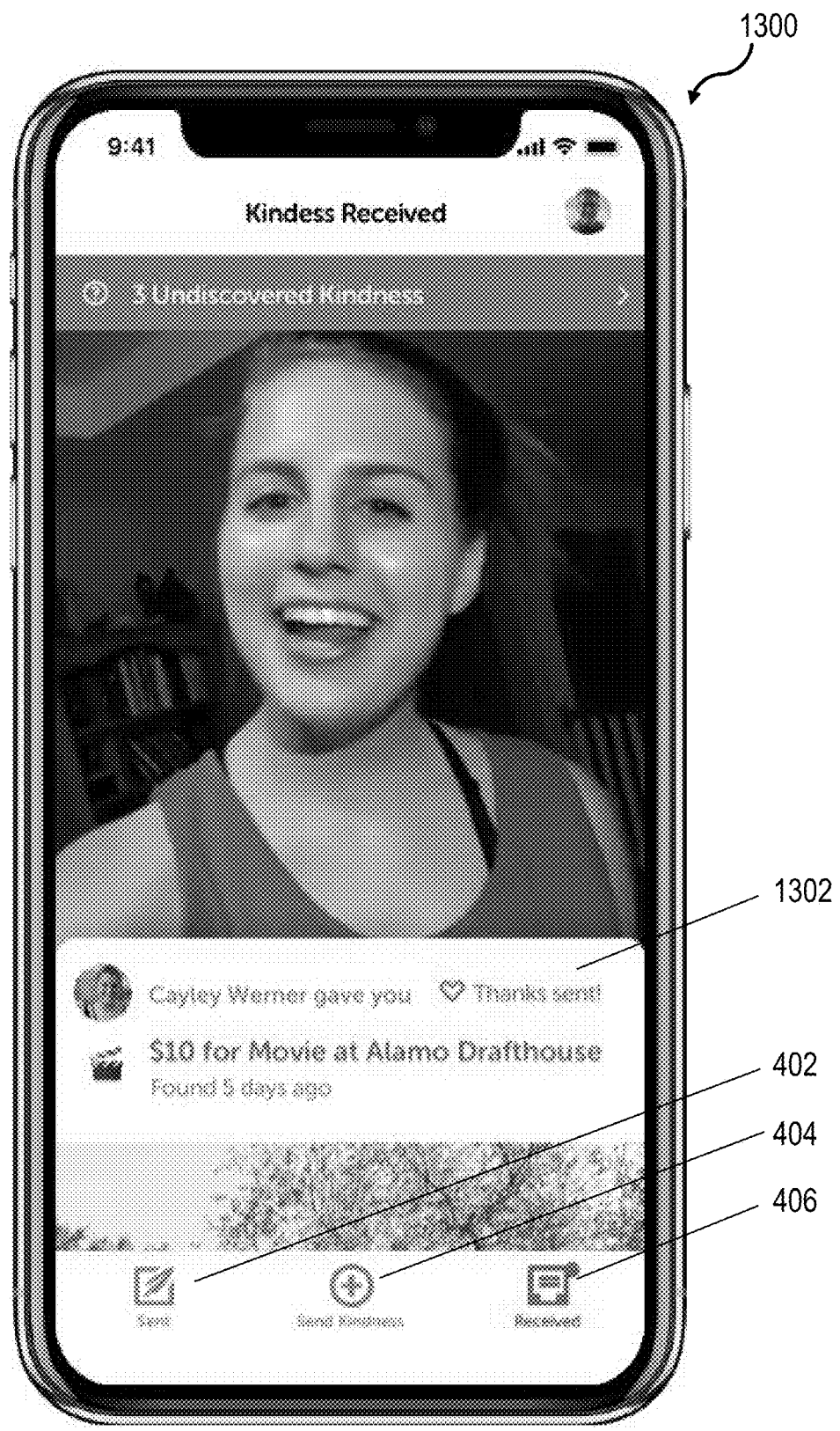
FIG. 13 illustrates an eighth graphical user interface of a CDM application in accordance with one embodiment.

With reference now to FIG. 13, there is illustrated a graphical user interface 1100 of a receiving CDM application 208c in accordance with one embodiment. In this example, graphical user interface 1300 contains a textual confirmation 1302 that the responsive electronic message was transmitted from the receiving CDM application 208c to the CDM application 208c of the message sender, for example, in response to selection of response control 1206 of FIG. 12. It should be appreciated that in at least some embodiments, this responsive electronic message does not contain or have associated any discoverability criteria and is consequently accessible to the original message sender immediately upon receipt at the sender's electronic communication device 102.

Although in the described use case, the message sender and message recipient both utilize the same CDM application 208c, it should be appreciated that this is not a requirement of the described electronic communication. For example, in at least some embodiments, the message recipient need not employ the same CDM application 208c utilized by the message sender to create the electronic message, and the electronic message, once discoverable, can be delivered to the message recipient via an alternative delivery modality, such as email, text, chat, social media post, automated voice call, etc.

In some embodiments, CDM application 208c supports a feature for message recipients referred to herein as "Pay It Forward." The Pay It Forward feature permits a message recipient to decline credit of the gift portion of an electronic message to the financial account of the message recipient and instead direct the gift amount into a Pay It Forward account of the application service provider associated with the geolocation of the electronic message. The balance of this Pay It Forward account and a predetermined Pay It Forward message content are then discoverable by the Nth (where N is a configurable positive integer) subsequent user of CDM application 208c to visit that geolocation. The Pay It Forward feature can be conveniently invoked through selection, by the message recipient, of an optional Pay It Forward control 1208, which can be included, for example, in graphical user interface 1200 of FIG. 12. In some embodiments, the Pay It Forward feature also allows the message recipient to add to the balance of the Pay It Forward account rather than to claim it. In this manner, a chain of multiple users of CDM application 208c can sequentially discover, and optionally add to the gift amount of, a Pay It Forward electronic message.

Figure 14:
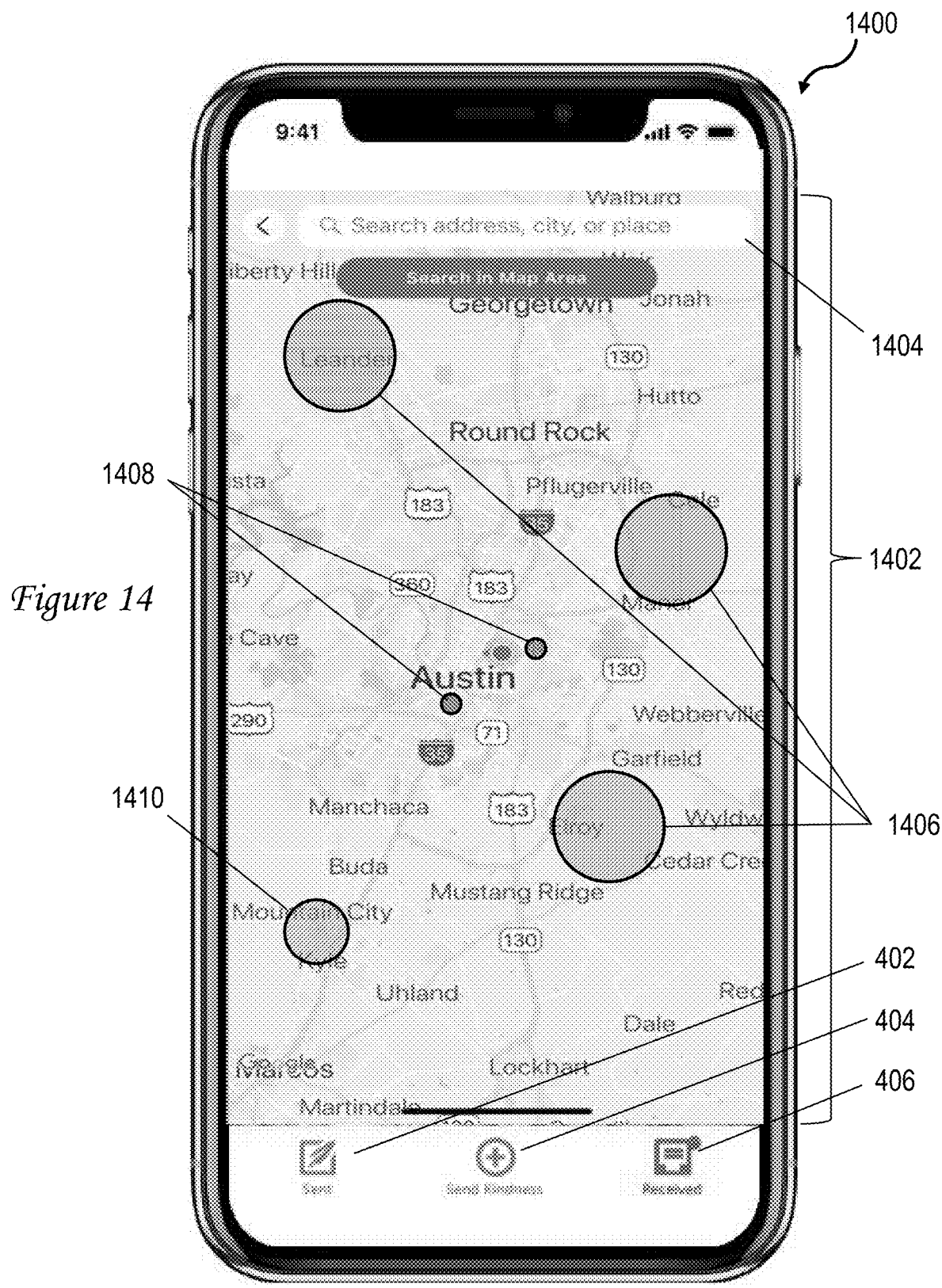
FIG. 14 depicts a ninth graphical user interface of a CDM application in accordance with one embodiment.

Referring now to FIG. 14, there is depicted a graphical user interface 1400 of CDM application 208c through which a user of CDM application 208c can visualize possible interactions available through CDM application 208c. Depending on implementation and configuration, graphical user interface 1400 may be presented to a user of CDM application 208c as a home screen of the application or may alternatively be presented by CDM application 208c in response to a user input or configuration of CDM application 208c.

Graphical user interface 1400 includes a map field 1402, which presents a map view of a selected terrestrial location at a desired level of magnification. The geographical area presented within map field 1402 can be adjusted by the user, for example, utilizing conventional pinching and/or pulling gestures. Graphical user interface 1400 additionally includes a location field 1404 that enables a user to obtaining presentation of a desired geolocation in map field 1402 by specifying a geographical or political subdivision (e.g., continent, country, state, county, city, etc.), physical address, and/or set of geo-coordinates.

In some embodiments, CDM application 208c presents within map field 1402, utilizing graphically distinct symbols (e.g., different colors, different shapes, etc.), receiving regions 1406, connection favorites 1408, and Pay It Forward sites 1410. Each receiving region 1406 is a general geographical area containing at least one geolocation at which the user is designated by at least one message sender as a message recipient. User knowledge of these general geographical areas can encourage the user to visit geolocations within the indicated geographical areas in an attempt to discover an electronic message for the user. In at least some embodiments, user selection of a receiving region 1406 within map field 1402 initiates a processing flow of CDM application 208c in which the user requests a hint regarding a geolocation at which the user is designated as a message recipient.

Connection favorites 1408 identify specific venues that connections of the user have identified as "favorites" and thus serve as suggestions to the user of geolocations at which the user can provide gifts to the user's connections. In at least some embodiments, user selection of a connection favorite 1408 within map field 1402 initiates a processing flow of CDM application 208c in which the user designates a gift for a connection that has identified the associated venue (or a good/service at the venue) as a "favorite." For example, detection of a "tap" gesture on a connection favorite 1408 can cause CDM application 208c to present a small pop-up window identifying the venue name and the name of the user's connection that has identified a favorite at the venue. Detection of a "deep press" gesture or a confirmation tap within the pop-up window can then cause CDM application 208c to initiate the transmission of an electronic message containing a gift that is discoverable by the connection at the venue. Thus, selection of a connection favorite 1408 enables a message sender to quickly input and CDM application 208c to receive both a message recipient and a geolocation criterion for an electronic message. The remainder of the processing flow for creating and transmitting the electronic message can be as described above with reference to blocks 308-312 of FIG. 3.

A Pay It Forward site 1410 identifies a general geographical area containing at least one geolocation associated with a Pay It Forward electronic message that has yet to be discovered and that is thus potentially discoverable by the user. User knowledge of these general geographical areas can encourage the user to visit geolocations within the indicated geographical areas in an attempt to discover (or contribute to) the Pay It Forward electronic message.

As has been described, the present application discloses techniques of communicating an electronic message. The discoverability of the content of an electronic message by a message recipient can be made dependent of the satisfaction of one or more criteria, which can include, for example, a recipient geo-location among other criteria.

Those skilled in the art will appreciate that many communication modalities can be employed to let people know you are thinking of them. However, many of these communication modalities, such as email, have become crowded out by spam and less important messages to the point where notifications for the receipt of these messages are being turned off by users as they try to regain a sense of life balance and digital well-being. The present application therefore appreciates that it would be useful and desirable to provide a new, immediate communication channel that permits a user to correspond with his or her family and friends in a thoughtful, serendipitous way.

The present application also appreciates that it would also be desirable to facilitate communication of expressions of kindness. One way in which kindness is commonly expressed is through the giving of gifts, such as physical gift cards. In practice, a gift card is often not redeemed by a gift recipient based on one or more factors, such as the gift recipient losing or forgetting the gift card, failing to bring the gift card at the time of purchase, or not being close enough to the physical location of a vendor to warrant making the effort to redeem the gift card. The described inventions can be employed to provide just-in-time delivery of a gift (e.g., an electronic coupon message or electronic account credit message) at the location the gift can be used and can be utilized to ensure that the giver's gift is not unredeemed or lost.

In one exemplary implementation, a gift giver (i.e., a message sender) can create an electronic message linked to a specific location and/or timeframe by utilizing the location services available in the message recipient's mobile device. Knowing the habits and rituals of friends and family, the giver can use the disclosed electronic communication methodologies to transmit time and/or location-specific electronic messages anywhere in the world to be discovered by the message recipient. These electronic messages can contain multi-media content and trigger a transfer of money or something of value from the giver to, or for the benefit of, the message recipient. These electronic messages also may be withheld from discovery if other discoverability criteria are not met. These criteria can include a window of time set by the giver or whether the giver is currently co-located with the receiver. Satisfaction of one criterion can also be utilized to trigger execution of a set of instructions that, in turn, determines if, when, and which electronic message should be delivered. For example, the criteria-dependent discoverability of an electronic message could cause an electronic message to be made discoverable by a message recipient on or after the third visit of a message recipient to a specified geolocation. In another example, the criteria-dependent discoverability of an electronic message could be utilized to deliver a coffee gift message if the location trigger is detected before 11 AM, to deliver a lunch gift message between 11 AM and 5 PM, and to deliver a wine gift message if the location trigger is detected after 5 PM, all using the same geolocation or geofence. Other examples could cause the electronic message to be made discoverable based on a recipient geolocation and the result of a sports score or weather metric (e.g., raining) or the geographical distance between the message sender and the message recipient. For example, a message sender might want to send a message that includes a beer when a friend enters a bar and his favorite sports team has won (or lost) the game. Other examples would include using the knowledge that a message recipient has discovered an electronic message in a certain geolocation to then activate another electronic message to be made discoverable either immediately or based on time and location for the same message recipient or someone else. Additional electronic messages could also be delivered after a set "linger time" at the message recipient's geolocation. For example, the message recipient could initially receive notification of a discoverable message immediately after walking into a restaurant to enjoy a drink from the giver, and then 30 minutes later, if still at the restaurant, the message recipient could get an additional electronic message to enjoy a complimentary desert or after-dinner drink from the giver. This capability would also allow the giver to combine offers from the venue into the messages that would only have been valid based on a certain length of time required to have been in the same geolocation.

While various inventions have been particularly shown as described with reference to one or more preferred embodiments, it will be understood by those skilled in the art that various changes in form and detail may be made therein without departing from the spirit and scope of the invention. For example, although various embodiments have been described in which various functions are performed through the execution of one or more applications on an electronic communication device, it should be appreciated that in other embodiments the inventive functions may be performed on an application service provider platform 116 accessed by the electronic communication device, for example, through execution of a browser application 216 or other remote access software. Similarly, it should be appreciated that the described functions need not all be performed on a single physical platform, but can instead be performed on multiple communicatively coupled physical platforms (e.g., which may be communicatively coupled via short range communication interfaces 232 or wireless WAN interfaces 230).

In the figures referenced herein, each block of a flowchart or block diagram may represent a module, segment, or portion of executable instructions or objects for implementing the specified logical function(s). Although the flowcharts contained herein necessarily depict processing steps being performed in a particular order, it will be appreciated by those skilled in the art that in various embodiments at least some of the processing steps can be performed concurrently, in a partially temporally overlapping manner, or in a different order than depicted. It should also be appreciated that each block of the block diagrams and/or flowcharts, as well as combinations of blocks in the block diagrams and/or flowcharts, can be implemented by special purpose hardware that perform the specified functions.

The inventions disclosed herein may be realized as a system, a method, and/or a computer program product. A computer program product may include a storage device having computer-readable program code stored thereon for causing a processor to carry out aspects of the inventions. The storage device may be, for example, an electronic storage device, a magnetic storage device, an optical storage device, an electromagnetic storage device, a semiconductor storage device, or any suitable combination of the foregoing. Specific examples of the storage device include a portable computer diskette, hard disk, random access memory (RAM), static random access memory (SRAM), read-only memory (ROM), an erasable programmable memory (EPROM or Flash memory), compact disc (CD), digital versatile disk (DVD), and a memory stick. A "storage device," as used herein, is specifically defined to include only statutory subject matter and to exclude non-statutory subject matter, such as signal media per se, transitory propagating signals per se, and energy per se.

What is claimed is:

1. A method of electronic communication, the method comprising:
   a processor of a mobile electronic communication device of a potential message recipient receiving, via an electronic communication network, one or more discoverability criteria of an electronic message that has been sent by a message sender and that is potentially discoverable by the potential message recipient, wherein the one or more discoverability criteria include a geo-location criterion specifying a geo-location for the mobile electronic communication device at which the electronic message is to be discoverable;
   the processor of the mobile electronic communication device receiving a sequence of differing time-varying geo-locations of the mobile electronic communication device;
   the processor determining whether the one or more discoverability criteria of the electronic message are satisfied based at least in part on the sequence of differing time-varying geo-locations of the mobile electronic communication device; and
   the processor making content of the electronic message sent by the message sender discoverable to the potential message recipient via the mobile electronic communication device based on determining that the one or more discoverability criteria of the electronic message are satisfied and withholding discoverability by the potential message recipient of the content of the potentially discoverable electronic message based on determining the one or more discoverability criteria have not yet been satisfied.

2. The method of claim 1, wherein:
   the mobile electronic communication device of the potential message recipient is a first electronic communication device;
   the message sender has a second electronic communication device; and
   at least one of the one or more discoverability criteria is based on a geo-location of the second electronic communication device.

3. The method of claim 1, wherein the one or more discoverability criteria include a temporal criterion.

4. The method of claim 3, wherein the temporal criterion includes a linger time of the mobile electronic communication device associated with the potential message recipient within a geographic area.

5. The method of claim 1, wherein making the message discoverable includes allowing presentation, utilizing the mobile electronic communication device associated with the message recipient, of a video message recorded by the message sender.

6. The method of claim 1, wherein:
the method further comprises the mobile electronic communication device receiving the electronic message prior to the determining.

7. A mobile electronic communication device, comprising:
a memory; and
a processor coupled to the memory, wherein the processor is configured to:
receive, via an electronic communication network, one or more discoverability criteria of an electronic message that has been sent by a message sender and that is potentially discoverable by a potential message recipient associated with the mobile electronic communication device, and wherein the one or more discoverability criteria include a geo-location criterion specifying a geo-location for the mobile electronic communication device at which the electronic message is to be discoverable;
receive a sequence of differing time-varying geo-locations of the mobile electronic communication device;
determine whether the one or more discoverability criteria of the electronic message are satisfied based at least in part on the sequence of differing time-varying geo-locations of the mobile electronic communication device; and
make content of the electronic message sent by the message sender discoverable to the potential message recipient via the mobile electronic communication device based on determining that the one or more discoverability criteria of the electronic message are satisfied and withhold discoverability by the potential message recipient of the content of the potentially discoverable electronic message based on determining the one or more discoverability criteria have not yet been satisfied.

8. The data processing system of claim 7, wherein:
the mobile electronic communication device of the potential message recipient is a first electronic communication device;
the message sender has a second electronic communication device; and
at least one of the one or more discoverability criteria is based on a geo-location of the second electronic communication device.

9. The data processing system of claim 7, wherein the one or more discoverability criteria include a temporal criterion.

10. The data processing system of claim 9, wherein the temporal criterion includes a linger time of the mobile electronic communication device associated with the potential message recipient within a geographic area.

11. The data processing system of claim 7, wherein the processor is configured, based on determining the one or more discoverability criteria of the electronic message are satisfied, to allow presentation, utilizing the mobile electronic communication device, of a video message recorded by the message sender.

12. A program product, comprising:
a storage device; and
program code stored within the storage device that, when executed by a processor of a mobile electronic communication device of a potential message recipient, causes the processor to perform:
receiving, via an electronic communication network, one or more discoverability criteria of an electronic message that has been sent by a message sender and that is potentially discoverable by the potential message recipient, wherein the one or more discoverability criteria include a geo-location criterion specifying a geo-location for the mobile electronic communication device at which the electronic message is to be discoverable;
receiving a sequence of differing time-varying geo-locations of the mobile electronic communication device;
determining whether the one or more discoverability criteria of the electronic message are satisfied based at least in part on the sequence of differing time-varying geo-locations of the mobile electronic communication device; and
making content of the electronic message sent by the message sender discoverable to the potential message recipient via the mobile electronic communication device based on determining that the one or more discoverability criteria of the electronic message are satisfied and withholding discoverability by the potential message recipient of the content of the potentially discoverable electronic message based on determining the one or more discoverability criteria have not yet been satisfied.

13. The program product of claim 12, wherein:
the mobile electronic communication device of the potential message recipient is a first electronic communication device;
the message sender has a second electronic communication device; and
at least one of the one or more discoverability criteria is based on a geo-location of the second electronic communication device.

14. The program product of claim 12, wherein the one or more discoverability criteria include a temporal criterion.

15. The program product of claim 14, wherein the temporal criterion includes a linger time of the mobile electronic communication device associated with the potential message recipient within a geographic area.

16. The program product of claim 12, wherein the program code, when executed by the processor, causes the processor, based on determining the one or more discoverability criteria of the electronic message are satisfied, to allow presentation, utilizing the mobile electronic communication device, of a video message recorded by the message sender.

* * * * *